United States Patent
Kawai et al.

(10) Patent No.: US 6,845,662 B2
(45) Date of Patent: Jan. 25, 2005

(54) THERMOSENSITIVE FLOW RATE DETECTING ELEMENT AND METHOD FOR THE MANUFACTURE THEREOF

(75) Inventors: Masahiro Kawai, Tokyo (JP); Motohisa Taguchi, Tokyo (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 0 days.

(21) Appl. No.: 10/378,919

(22) Filed: Mar. 5, 2003

(65) Prior Publication Data

US 2003/0185270 A1 Oct. 2, 2003

(30) Foreign Application Priority Data

Apr. 2, 2002 (JP) ........................................ 2002-099994

(51) Int. Cl.[7] ................................................ G01F 1/68
(52) U.S. Cl. .................................................. 73/204.26
(58) Field of Search ........................ 73/204.26, 204.24, 73/204.25

(56) References Cited

U.S. PATENT DOCUMENTS

| | | | |
|---|---|---|---|
| 6,314,807 B1 * 11/2001 | Kawai et al. | ............ | 73/204.26 |
| 6,470,742 B1 * 10/2002 | Yamakawa et al. | ...... | 73/204.26 |
| 6,631,638 B2 * 10/2003 | James et al. | ............. | 73/204.26 |

FOREIGN PATENT DOCUMENTS

| | | |
|---|---|---|
| JP | 06-249693 | 9/1994 |
| JP | 09-043018 | 2/1997 |

* cited by examiner

Primary Examiner—Edward Lefkowitz
Assistant Examiner—Jewel Thompson
(74) Attorney, Agent, or Firm—Sughrue Mion, PLLC (57) ABSTRACT

A dummy pattern is constituted by frame-shaped first patterns formed on a flat substrate so as to surround a resistance heater and a fluid temperature resistance thermometer, and frame-shaped second patterns formed on inner perimeter sides of the first patterns, edge portions of first and second diaphragm portions being positioned between the first patterns and the second patterns.

5 Claims, 10 Drawing Sheets

THERMOSENSITIVE FLOW RATE DETECTING ELEMENT AND METHOD FOR THE MANUFACTURE THEREOF

BACKGROUND OF THE INVENTION

1. Field of the Invention

The present invention relates to a flow rate sensor for measuring an amount of intake air in an internal combustion engine, for example, and relates particularly to a thermosensitive flow rate detecting element provided with a heating element for measuring a flow velocity or flow rate of a fluid based on heat transfer to the fluid from the heating element or a portion heated by the heating element, and further relates to a method for the manufacture thereof.

2. Description of the Related Art

Figure 14:
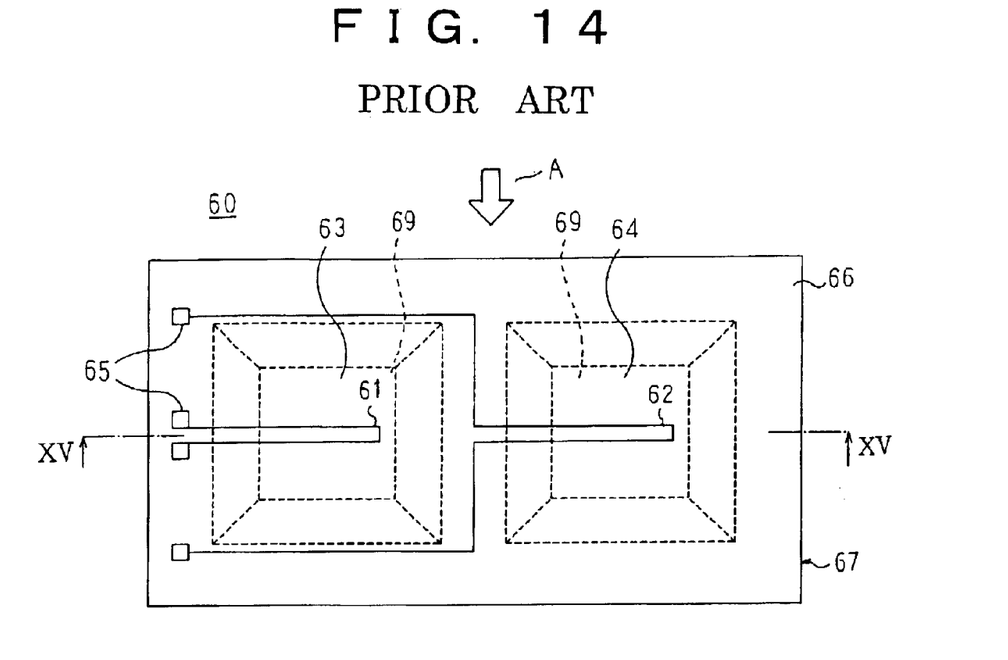
FIG. 14 is a front elevation showing a first conventional thermosensitive flow rate detecting element.
Figure 15:
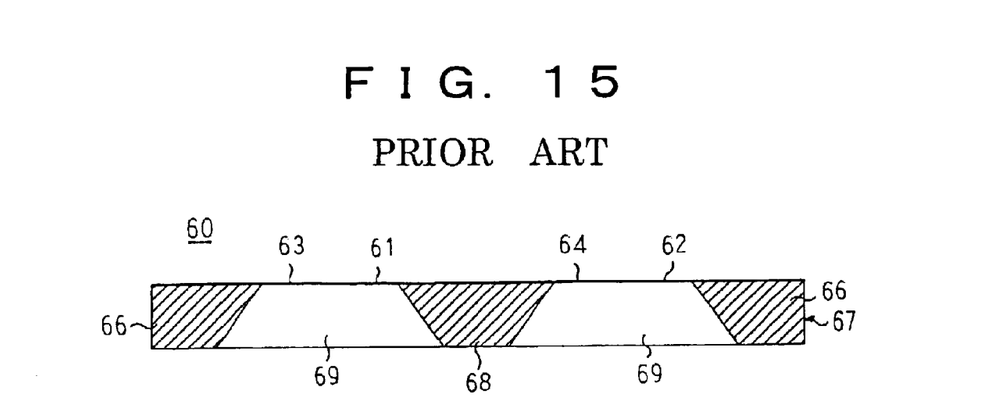
FIG. 15 is a cross section taken along line XV—XV in FIG. 14 viewed from the direction of the arrows.

FIG. 14 is a front elevation showing a first conventional thermosensitive flow rate detecting element such as described in Japanese Patent Laid-Open No. HEI 6-249693, for example, and FIG. 15 is a cross section taken along line XV—XV in FIG. 14 viewed from the direction of the arrows.

In FIGS. 14 and 15, first and second films 63 and 64 are formed separately on a front surface of a silicon substrate 67 made by a single-crystal silicon. A measuring element 61 is formed on the first film 63, and a medium temperature measuring element 62 is formed on the second film 64. A frame 66 is prepared by forming two notches 69 having a trapezoidal cross-sectional shape in a rear surface of the silicon substrate 67. These notches 69 are formed so as to reach the first and second films 63 and 64. Thus, the first and second films 63 and 64 are stretched across the frame 66, forming a diaphragm construction, and a silicon support 68 functioning as an isothermal element is disposed between the first and second films 63 and 64. In addition, electrode terminals 65 connected to the measuring element 61 and the medium temperature measuring element 62, respectively, are formed on the front surface of the frame 66.

Next, operation of a first conventional thermosensitive flow rate detecting element 60 constructed in this manner will be explained.

A mass flow such as an airflow, for example, is allowed to flow over the front surface of the first thermosensitive flow rate detecting element 60 as indicated by an arrow A in FIG. 14. Then, the measuring element 61 is heated by applying an electric current to the measuring element 61 by means of the electrode terminals 65. Electrical resistance in the measuring element 61 is also measured. Moreover, the measuring element 61 is designed such that the resistance changes with temperature. The measuring element 61 is cooled by the passing airflow. The extent of this cooling is dependent upon the mass flow of the passing medium. Thus, when the current heating the measuring element 61 is maintained constant, the strength of the flow of the medium can be detected by measuring the resistance in the measuring element 61.

Moreover, the medium temperature measuring element 62 is used in order to suppress the influence of the medium on the measurement signal.

In this first conventional thermosensitive flow rate detecting element 60, because the notches 69 are formed by etching, there is a certain amount of irregularity in the size of the diaphragm portions. And because the diaphragm portion of the first film 63 contacts the frame 66 around the entire perimeter, some of the heat generated by the measuring element 61 is not cooled by the airflow, but is instead transferred through the diaphragm portion to the frame 66. Thus, irregularities in the size of the diaphragm portion lead to irregularities in the amount of heat transferred through the diaphragm portion to the frame 66. As a result, one problem has been that flow rate detection characteristics differ among first thermosensitive flow rate detecting elements 60, preventing accurate flow rate detection.

Furthermore, the medium temperature measuring element 62 is formed on the diaphragm portion of the second film 64 in order to ensure responsiveness to temperature changes in the medium. However, because the diaphragm portion of this second film 64 contacts the frame 66 around its entire perimeter, it is easily subjected to the influence of the temperature of the frame 66. Thus, one problem has been that irregularities arise in medium temperature detection performance as a result of the irregularities in the size of the diaphragm portion.

In order to solve these problems, a thermosensitive flow rate detecting element is proposed in Japanese Patent Laid-Open No. HEI 9-43018, for example, in which a heat transfer layer is formed in the heat transfer pathway by which the heat generated by the heating body (the measuring element 61) passes through the diaphragm portion and is transferred to the substrate (the frame 66), the heat generated by the heating body being transferred to the substrate through the heat transfer layer.

Figure 16:
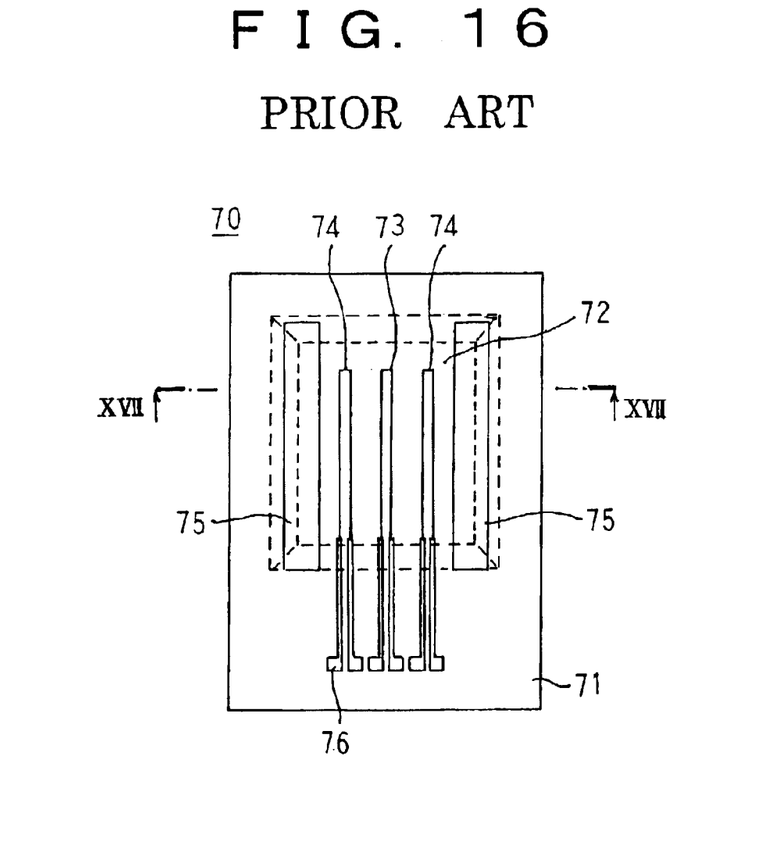
FIG. 16 is a front elevation showing a second conventional thermosensitive flow rate detecting element.
Figure 17:
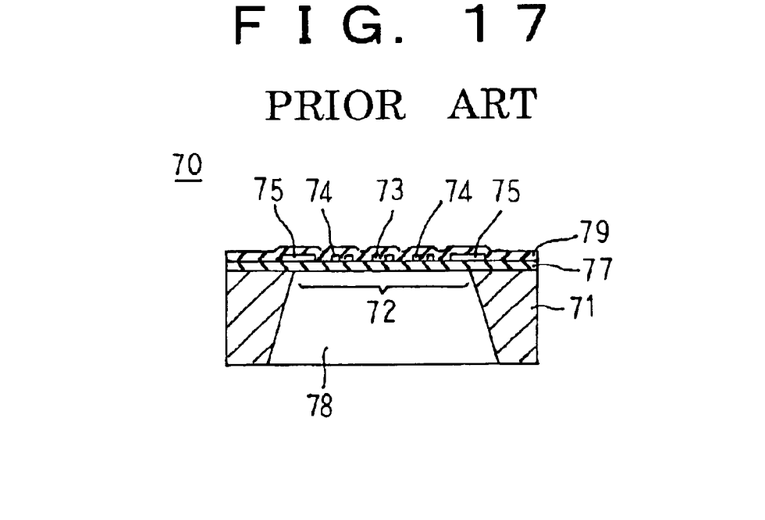
FIG. 17 is a cross section taken along line XVII—XVII in FIG. 16 viewed from the direction of the arrows.

FIG. 16 is a front elevation showing a second conventional thermosensitive flow rate detecting element such as described in Japanese Patent Laid-Open No. HEI 9-43018, for example, and FIG. 17 is a cross section taken along line XVII—XVII in FIG. 16 viewed from the direction of the arrows.

In FIGS. 16 and 17, a diaphragm layer 77 is formed on a front surface of a substrate 71, and notches 78 having a trapezoidal cross-sectional shape are formed so as to reach the diaphragm layer 77 from a rear surface of the substrate 71. Thus, the diaphragm layer 77 is stretched across the substrate 71, constituting a diaphragm portion 72. A heating body 73 and temperature sensors 74 are formed on the diaphragm portion 72. In addition, heat transfer layers 75 made by metal layers are formed so as to cover edge portions of the diaphragm portion 72 on first and second sides of the heating body 73 and the temperature sensors 74. Furthermore, electrode terminals 76 connected to the heating body 73 and the temperature sensors 74, respectively, are formed on the front surface of the substrate 71. In addition, a protective layer 79 is formed by coating so as to cover the heating body 73, the temperature sensors 74, the heat transfer layers 75, etc.

In a second conventional thermosensitive flow rate detecting element 70 constructed in this manner, the heating body 73, the temperature sensors 74, and the heat transfer layers 75 can be formed simultaneously by forming a thermosensitive resistor film on the diaphragm layer 77 then using photoengraving techniques and etching techniques. Thus, relative positional relationships among the heating body 73, the temperature sensors 74, and the heat transfer layers 75 are ensured with high precision. The coefficient of thermal conductivity of the heat transfer layers 75 is extremely large compared to that of the diaphragm layer 77. The heat transfer layers 75 are formed so as to cover two facing edge portions of the diaphragm portion 72. Consequently, the heat generated by the heating body 73 is transferred to the heat transfer layers 75 through the diaphragm portion 72, and then transferred to the substrate 71 through the heat transfer layers 75. Thus, because the amount of heat transferred from the heating body 73 to the substrate 71 is constant regardless of the size of the diaphragm portion 72, it is claimed that irregularities in the flow rate detection characteristics between first thermosensitive flow rate detecting elements 60 are suppressed, enabling accurate flow rate detection.

In an internal combustion engine in an automobile, vibrations of 40 to 50 g (1 g=approx. 9.8 m/s$^2$) are generated, and there are also cases where the flow velocity of the intake air reaches 200 m/s or more. Furthermore, when a backfire occurs, a pressure of nearly two atmospheres may also act on the thermosensitive flow rate detecting element. Thus, when a thermosensitive flow rate detecting element having a diaphragm construction is subjected to mechanical stress of this kind, if the size of the diaphragm portion is larger than a design value (a desired value), or if there is an abnormality in the shape of the diaphragm portion, problems arise such as the diaphragm portion being damaged.

However, in the first conventional thermosensitive flow rate detecting element 60, because the diaphragm portion is formed by etching the silicon substrate 67, there is a certain amount of the irregularity in the size of the diaphragm portion. As a result, in the first thermosensitive flow rate detecting element 60, irregularities arise in the flow rate detection characteristics and the fluid temperature detection performance, preventing accurate flow rate detection, and if applied to uses in measuring the amount of intake air rate in an internal combustion engine of an automobile, problems may arise such as the occurrence of accidents which are damaging to the first thermosensitive flow rate detecting element 60.

On the other hand, in the second conventional thermosensitive flow rate detecting element 70, although irregularities in the flow rate detection characteristics and the fluid temperature detection performance resulting from irregularities in the size of the diaphragm portion are suppressed by forming the heat transfer layers 75, no consideration is given to keeping the size of the diaphragm portion 72 to a design value, and if applied to use in measuring the amount of intake air rate in an internal combustion engine of an automobile, problems may arise such as the occurrence of accidents which are damaging to the second thermosensitive flow rate detecting element 70 as a result of the irregularities in the size of the diaphragm portion.

SUMMARY OF THE INVENTION

The present invention aims to solve the above problems and an object of the present invention is to provide a thermosensitive flow rate detecting element having high detection precision and high reliability, and to a method for the manufacture thereof, by disposing a dummy pattern on a front surface of a flat substrate for shape dimension inspection of a diaphragm portion to enable easy and accurate inspection of the shape and the dimensions of the diaphragm portion using the dummy pattern, thereby suppressing irregularities in flow rate detection characteristics and fluid temperature detection performance, and also suppressing the occurrence of damaging accidents resulting from enlargement and shapes abnormalities in the diaphragm portion.

With the above object in view, a thermosensitive flow rate detecting element of the present invention includes a flat substrate, an electrically-insulating support film formed on a front surface of the flat substrate, a resistor made by a thermosensitive resistor film formed on the support film, a lead pattern made by a thermosensitive resistor film formed on a front surface of the flat substrate so as to be linked to the resistor, and a rectangular diaphragm portion formed by removing a portion of the flat substrate from a rear surface side of the flat substrate under a region where the resistor is formed so as to reach the support film. The thermosensitive flow rate detecting element is characterized in that a dummy pattern for shape dimension inspection of the diaphragm portion is formed on a front surface of the flat substrate outside or inside or both outside and inside at least two adjacent edge portions of the diaphragm portion so as to lie alongside the edge portions.

Therefore, the shape dimension of the diaphragm portion is suppressed to within a predetermined range of irregularity, and misalignment of the resistor relative to the diaphragm portion is suppressed to within a predetermined range, enabling a thermosensitive flow rate detecting element to be provided in which irregularities in flow rate detection characteristics and fluid temperature detection performance are reduced and reliability is high.

With the object in view, a method for manufacturing a thermosensitive flow rate detecting element of the present invention includes the step of forming an electrically-insulating support film on a front surface of a flat substrate, the step of forming on the support film a resistor made by a thermosensitive resistor film and a lead pattern connected to the resistor, the step of forming on a front surface of the flat substrate a dummy pattern for shape inspection of a diaphragm portion, and the step of forming the diaphragm portion by removing a portion of the flat substrate from a rear surface side of the flat substrate under a region where the resistor is formed so as to reach the support film. The method for manufacturing a thermosensitive flow rate detecting element further includes the step of inspecting a shape dimension of the diaphragm portion based on a positional relationship between the dummy pattern and an edge portion of the diaphragm portion.

Therefore, the present invention is able to provide a method for manufacturing a thermosensitive flow rate detecting element enabling irregularities in the shape dimension of the diaphragm portion to be suppressed and also enabling misalignment of the resistor relative to the diaphragm portion to be suppressed.

DETAILED DESCRIPTION OF THE PREFERRED EMBODIMENTS

Preferred embodiments of the present invention will now be explained with reference to the drawings.

Embodiment 1

Figure 1:
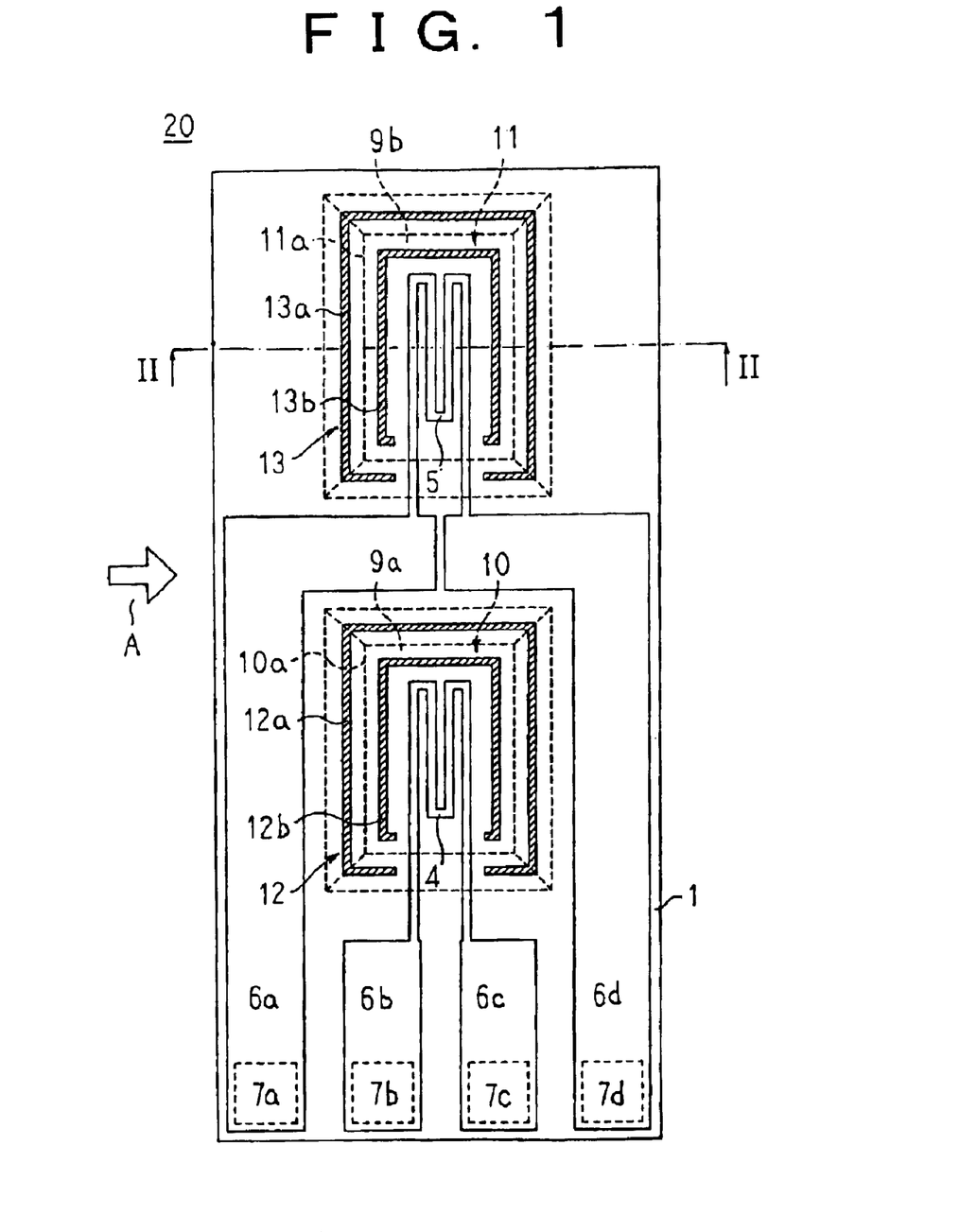
FIG. 1 is a front elevation showing a thermosensitive flow rate detecting element according to Embodiment 1 of the present invention.
Figure 2:
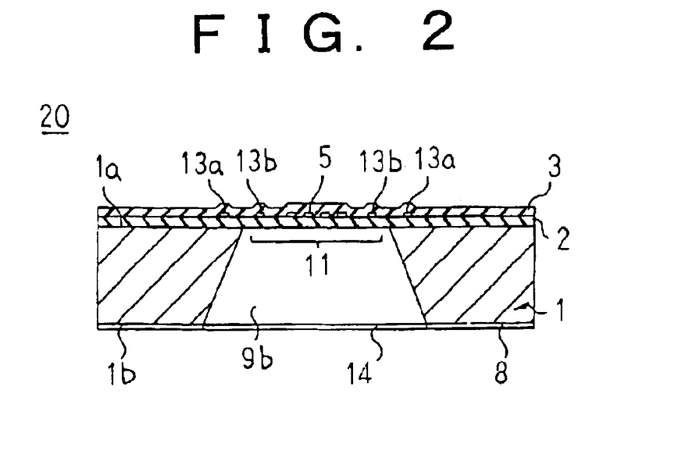
FIG. 2 is a cross section taken along line II—II in FIG. 1 viewed from the direction of the arrows.

FIG. 1 is a front elevation showing a thermosensitive flow rate detecting element according to Embodiment 1 of the present invention, and FIG. 2 is a cross section taken along line II—II in FIG. 1 viewed from the direction of the arrows. Here in FIG. 1, a direction of flow of a fluid being measured relative to the flow rate detecting element is indicated by an arrow A, and in order to make the construction easier to see, a protective layer has been removed. Furthermore, in order to make the construction easier to see, FIGS. 1 and 2 are not drawn to actual scale. Moreover, the same applies to each of the figures below.

In FIGS. 1 and 2, an electrically-insulating support film 2 is formed over an entire front surface 1a of a flat substrate 1 made by silicon, a resistance heater 4 functioning as a resistor made by a thermosensitive resistor film, a fluid temperature resistance thermometer 5 functioning as a resistor, first to fourth lead patterns 6a to 6d, a resistance heater dummy pattern 12, and a resistance thermometer dummy pattern 13 are formed in predetermined positions on the support film 2, and in addition, an electrically-insulating protective film 3 is formed so as to cover the resistance heater 4, the fluid temperature resistance thermometer 5, the first to fourth lead patterns 6a to 6d, and the dummy patterns 12 and 13.

First to fourth electrode terminals 7a to 7d are formed by exposing end portions of the first to fourth lead patterns 6a to 6d by removing the protective film 3. The resistance heater 4 and the fluid temperature resistance thermometer 5 are connected to an external portion by means of the first to fourth lead patterns 6a to 6d and the first to fourth electrode terminals 7a to 7d by electrically connecting the first to fourth electrode terminals 7a to 7d to the external portion by a method such as wire bonding.

First and second cavities 9a and 9b are formed by removing portions of the flat substrate 1 from a rear surface 1b side positioned under regions where the resistance heater 4 and the fluid temperature resistance thermometer 5, respectively, are formed until the support film 2 is reached. Thus, thin-walled first and second diaphragm portions 10 and 11 are formed above the first and second cavities 9a and 9b, respectively. Thus, the first diaphragm portion 10 is constructed such that a perimeter of a laminated film in which the resistance heater 4 is held between the support film 2 and the protective film 3 is held on the flat substrate 1, and the second diaphragm portion 11 is constructed such that a perimeter of a laminated film in which the fluid temperature resistance thermometer 5 is held between the support film 2 and the protective film 3 is held on the flat substrate 1.

The first and second cavities 9a and 9b are formed with a trapezoidal cross-sectional shape, and the first and second diaphragm portions 10 and 11 are formed into rectangular shapes. The resistance heater dummy pattern 12 is constituted by: a first pattern 12a formed outside four edge portions 10a of the first diaphragm portion 10 so as to lie alongside the edge portions 10a; and a second pattern 12b formed inside the four edge portions 10a so as to lie alongside the edge portions 10a, the first and second patterns 12a and 12b being formed so as to avoid the second and third lead patterns 6b and 6c by cutting away a portion of one side of their frame shapes. Similarly, the resistance thermometer dummy pattern 13 is constituted by: a first pattern 13a formed outside four edge portions 11a of the second diaphragm portion 11 so as to lie alongside the edge portions 11a; and a second pattern 13b formed inside the four edge portions 11a so as to lie alongside the edge portions 11a, the first and second patterns 13a and 13b being formed so as to avoid the first and fourth lead patterns 6a and 6d by cutting away a portion of one side of their frame shapes.

Here, the support film 2 and the protective film 3 are prepared using an electrically-insulating material such as silicon nitride. The thermosensitive resistor film constituting the resistance heater 4, the fluid temperature resistance thermometer 5, the first to fourth lead patterns 6a to 6d, the resistance heater dummy pattern 12, and the resistance thermometer dummy pattern 13 is made by a material whose resistance value is dependent on temperature, the material being made, for example, by platinum, nickel, or a nickel-iron alloy (such as permalloy, trademark of the Western Electric Company), etc.

The first and second patterns 12a and 12b of the resistance heater dummy pattern 12 are formed into shape dimensions allowable relative to the desired values of the shape dimensions of the first diaphragm portion 10. Similarly, the first and second patterns 13a and 13b of the resistance thermometer dummy pattern 13 are formed into shape dimensions allowable relative to the desired values of the shape dimensions of the second diaphragm portion 11.

Next, a method for manufacturing a thermosensitive flow rate detecting element 20 constructed in this manner will be explained.

First, the support film 2 is formed on the flat substrate 1, which is made by a silicon substrate having a thickness of 0.4 mm, by forming a film of silicon nitride to a thickness of 1 $\mu$m over the entire front surface 1a of the flat substrate 1 by a method such as sputtering, chemical vapor deposition (CVD), etc. Next, a film of platinum is formed to a thickness of 0.2 $\mu$m over an entire front surface of the support film 2 by a method such as vapor deposition, sputtering, etc. Then, the resistance heater 4, the fluid temperature resistance thermometer 5, the first to fourth lead patterns 6a to 6d, the resistance heater dummy pattern 12, and the resistance thermometer dummy pattern 13 are formed by patterning the platinum film using a method such as photoengraving, wet etching (or dry etching), etc.

In addition, the protective film 3 is formed by forming a film of silicon nitride to a thickness of 1 $\mu$m over the entire front surface of the support film 2 by a method such as sputtering, CVD, etc. Then, the first to fourth electrode terminals 7a to 7d are formed by removing the protective film 3 above the end portions of the first to fourth lead patterns 6a to 6d using a method such as photoengraving, wet etching (or dry etching), etc.

Next, a rear-surface protective film 8 is formed by applying a resist to the entire rear surface 1b of the flat substrate 1. Then, etching holes 14 are formed by removing portions of the rear-surface protective film 8 using photoengraving, etc. Thereafter, the first and second cavities 9a and 9b are formed by removing a portion of the flat substrate 1 so as to reach the support film 2 from the rear surface 1b side of the flat substrate 1 by applying alkali etching, for example. Thus, the first and second diaphragm portions 10 and 11 are formed above the first and second cavities 9a and 9b. Here, KOH, tetramethyl ammonium hydroxide (TMAH), NaOH, etc., are used as the etchant.

In a thermosensitive flow rate detecting element 20 prepared in this manner, inspection of whether the edge portions 10a and 11a of the first and second diaphragm portions 10 and 11 are positioned between the first patterns 12a and 13a and the second patterns 12b and 13b is made using a microscope. Thus, a thermosensitive flow rate detecting element 20 is obtained in which the edge portions 10a and 11a of the first and second diaphragm portions 10 and 11 are positioned between the first patterns 12a and 13a and the second patterns 12b and 13b.

Moreover, the first and second diaphragm portions 10 and 11 are formed to a size of 1.5 mm×2 mm, and the resistance heater 4 and the fluid temperature resistance thermometer 5 are formed to a size of 0.8 mm×1 mm substantially in central portions of the first and second diaphragm portions 10 and 11. The first patterns 12a and 13a are formed into a partially cut away frame shape with a pattern width of 10 $\mu$m having an inner perimeter shape of (1.5 mm+50 $\mu$m)×(2 mm+50 $\mu$m), and the second patterns 12b and 13b are formed into a partially cut away frame shape with a pattern width of 10 $\mu$m having an outer perimeter shape of (1.5 mm−50 $\mu$m)×(2 mm−50 $\mu$m). Here, the desired value of the shape dimensions of the first and second diaphragm portions 10 and 11 is 1.5 mm×2 mm, the tolerance values being ±50 $\mu$m.

Figure 3:
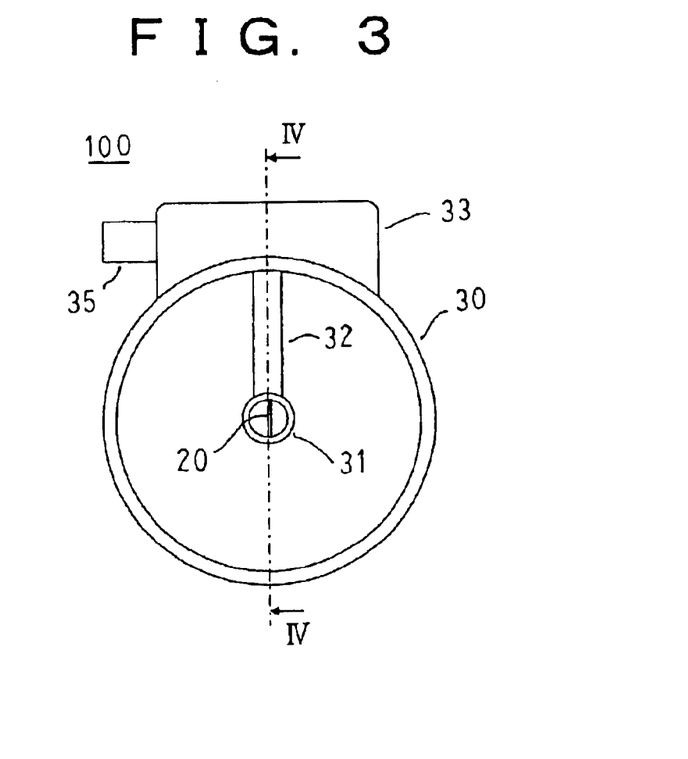
FIG. 3 is a front elevation showing a flow rate sensor using the thermosensitive flow rate detecting element according to Embodiment 1 of the present invention.
Figure 4:
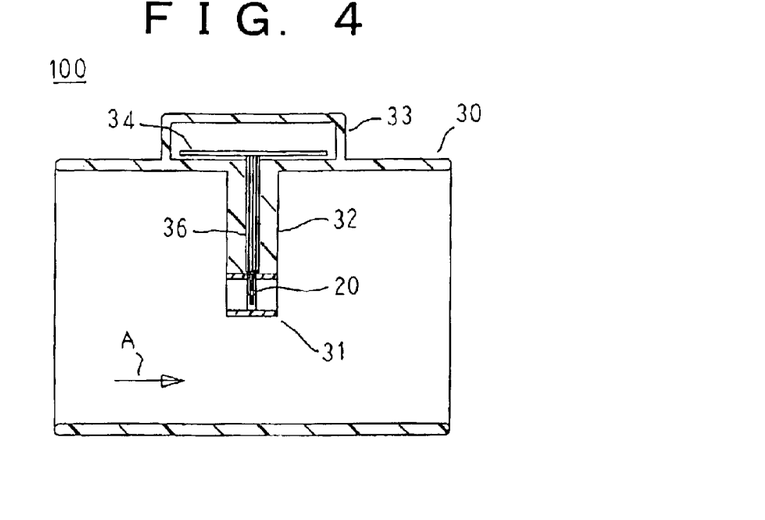
FIG. 4 is a cross section taken along line IV—IV in FIG. 3 viewed from the direction of the arrows.
Figure 5:
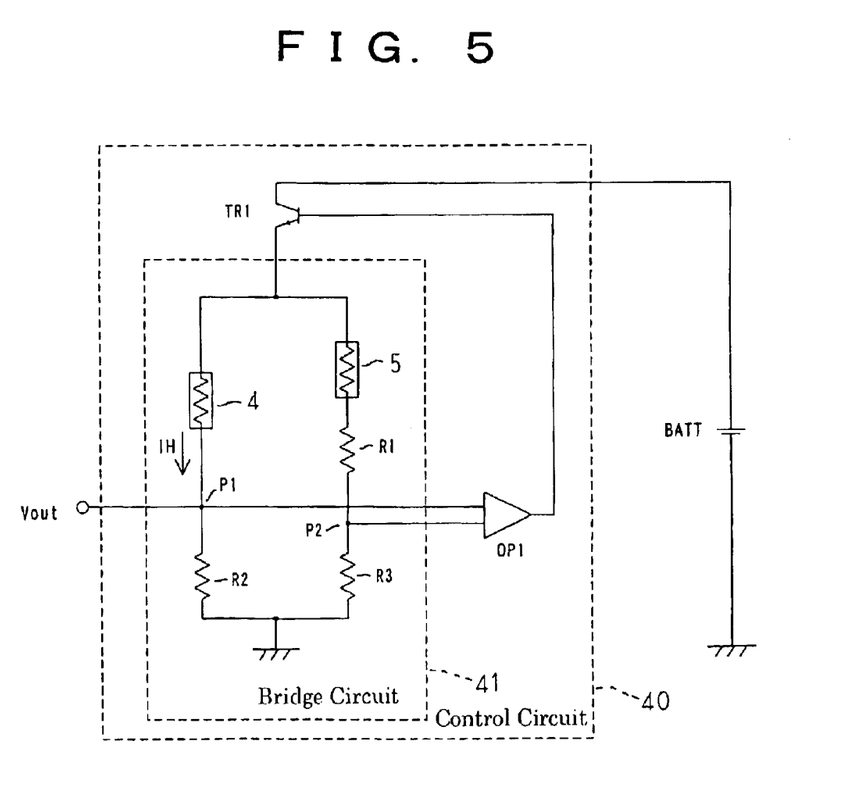
FIG. 5 is a circuit diagram showing a control circuit for the thermosensitive flow rate detecting element according to Embodiment 1 of the present invention.

Next, the construction of a flow rate sensor 100 using this thermosensitive flow rate detecting element 20 will be explained with reference to FIGS. 3 to 5. Here, FIG. 3 is a front elevation showing the flow rate sensor 100 using the thermosensitive flow rate detecting element 20, FIG. 4 is a cross section taken along line IV—IV in FIG. 3 viewed from the direction of the arrows, and FIG. 5 is a circuit diagram showing a control circuit for the thermosensitive flow rate detecting element 20. Moreover, an arrow A in FIG. 4 indicates the direction of flow of an airflow.

The flow rate sensor 100, as shown in FIGS. 3 and 4, is constituted by: a cylindrical main passage 30 being a passage for a fluid being measured; a detector conduit 31 disposed coaxially inside the main passage 30 so as to be supported by a support member 32 disposed so as to extend from an inner wall surface of the main passage 30; a case 33 mounted to the main passage 30 for housing a control circuit board 34; a connector 35 mounted to the case 33 for supplying electric power to the flow rate sensor 100 and extracting output; and the thermosensitive flow rate detecting element 20 disposed inside the detector conduit 31.

The control circuit board 34 and the first to fourth electrode terminals 7a to 7d of the thermosensitive flow rate detecting element 20 are electrically connected by lead wires 36 embedded inside the support member 32. Furthermore, the thermosensitive flow rate detecting element 20 is disposed inside the detector conduit 31 such that the front surface 1a of the flat substrate 1 is parallel to the direction of flow A of the fluid being measured and is exposed to the fluid being measured.

The control circuit 40 of this flow rate sensor 100, as shown in FIG. 5, is composed of a bridge circuit 41 including the resistance heater 4 and the fluid temperature resistance thermometer 5. Moreover, in FIG. 5, first to third resistors R1, R2, and R3 are fixed resistors, OP1 is an operational amplifier, TR1 is a transistor, and BATT is an electric power supply. Except for the resistance heater 4 and the fluid temperature resistance thermometer 5, the control circuit is mounted on the control circuit board 34.

In this flow rate sensor 100, the control circuit 40 controls a heating current IH in the resistance heater 4 by functioning to make an electric potential at point P1 and an electric potential at point P2 in FIG. 5 generally equal. As a result, the average temperature of the resistance heater 4 is maintained at a predetermined value.

For example, if the flow velocity of the fluid being measured is high, heat transfer from the resistance heater 4 to the fluid being measured increases and the temperature of the resistance heater 4 drops. Then, the heating current IH is increased by the control circuit 40 to compensate for the increase in heat transfer from the resistance heater 4 to the fluid being measured, maintaining the average temperature of the resistance heater 4 at the predetermined value.

The flow velocity or the flow rate flowing along a passage having a predetermined passage cross-sectional area is detected by detecting this heating current IH as a voltage Vout at first and second ends of the second resistor R2.

Now, if RH is the resistance value of the resistance heater 4, TH is the average temperature of the resistance heater 4, TA is the temperature of the fluid being measured, and Q is the flow rate of the fluid being measured flowing through the passage having a predetermined passage cross-sectional area (the detector conduit 31), then Expression (1) is satisfied.

$$IH^2 \cdot RH = (a + b \cdot Q^n)(TH - TA) \tag{1}$$

where a, b, and n are constants determined by the form of the thermosensitive flow rate detecting element. a is a coefficient corresponding to the amount of heat independent of the flow rate, a large portion thereof being heat transfer loss from the resistance heater 4 to the flat substrate 1. On the other hand, b is a coefficient corresponding to forced convection heat transfer. n is a value determined by the mode of the flow of the fluid being measured in the vicinity of the resistance heater 4, being approximately 0.5. Furthermore, from Expression (1), it can be seen that the amount of heat corresponding to coefficient a does not contribute to flow rate detection.

Thus, by keeping {(TH−TA)/RH} constant regardless of TA, IH becomes a function of Q. Then, output corresponding to IH becomes the detected flow rate output from the flow rate sensor.

Here, a direct heating control method in which the resistance heater 4 and the fluid temperature resistance thermometer 5 form a bridge circuit was explained, but the same applies to an indirect heating control method in which a resistance thermometer is disposed in the vicinity of the resistance heater 4 and the resistance thermometer and the fluid temperature resistance thermometer form a bridge circuit.

In the thermosensitive flow rate detecting element 20 constructed in this manner, the first and second diaphragm portions 10 and 11 are formed by forming the etching holes 14 in the rear surface 1b of the flat substrate 1, and etching the flat substrate 1 from the etching holes 14. Thus, a certain amount of irregularity may occur in the dimensions of the first and second diaphragm portions 10 and 11 and in the position of the resistance heater 4 and the fluid temperature resistance thermometer 5 relative to the first and second diaphragm portions 10 and 11 as a result of the etching holes 14 being misaligned relative to the resistance heater 4 and the fluid temperature resistance thermometer 5 which is formed into the front surface 1a of the flat substrate 1 and as a result of irregularities in the thickness of the flat substrate 1.

Furthermore, in the process of forming the etching holes 14, if a flaw has occurred in the rear-surface protective film 8, the flat substrate 1 may also be etched from the portion of the rear-surface protective film 8 with the flaw, giving rise to an abnormality in a portion of the diaphragm shape.

Figure 6:
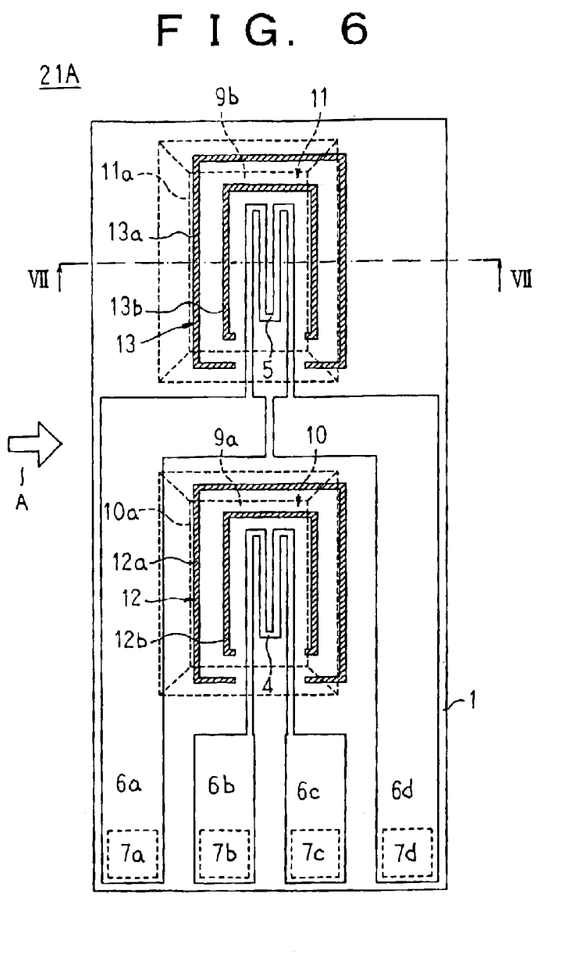
FIG. 6 is a front elevation showing an example of a defective thermosensitive flow rate detecting element.

Etching failure in the diaphragm portion will now be explained with reference to FIGS. 6 to 11. FIG. 6 is a front elevation showing a thermosensitive flow rate detecting element in which excessive misalignment has arisen in the diaphragm portions, FIG. 7 is a cross section taken along line VII—VII in FIG. 6 viewed from the direction of the arrows, FIG. 8 is a front elevation showing a thermosensitive flow rate detecting element in which excessive dimensions have arisen in the diaphragm portions, FIG. 9 is a cross section taken along line IX—IX in FIG. 8 viewed from the direction of the arrows, FIG. 10 is a front elevation showing a thermosensitive flow rate detecting element in which an abnormal shape has arisen in a diaphragm portion, and FIG. 11 is a cross section taken along line XI—XI in FIG. 10 viewed from the direction of the arrows.

Figure 7:
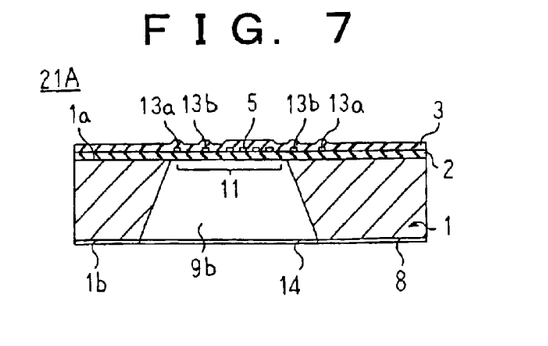
FIG. 7 is a cross section taken along line VII—VII in FIG. 6 viewed from the direction of the arrows.

First, when a thermosensitive flow rate detecting element 21A being prepared is formed with the position of the etching holes 14 misaligned relative to the resistance heater 4 and the fluid temperature resistance thermometer 5 formed on the front surface 1a of the flat substrate 1, portions of the edge portions 10a and 11a of the first and second diaphragm portions 10 and 11 project beyond the gaps between the first patterns 12a and 13a and the second patterns 12b and 13b, as shown in FIGS. 6 and 7, for example.

Figure 8:
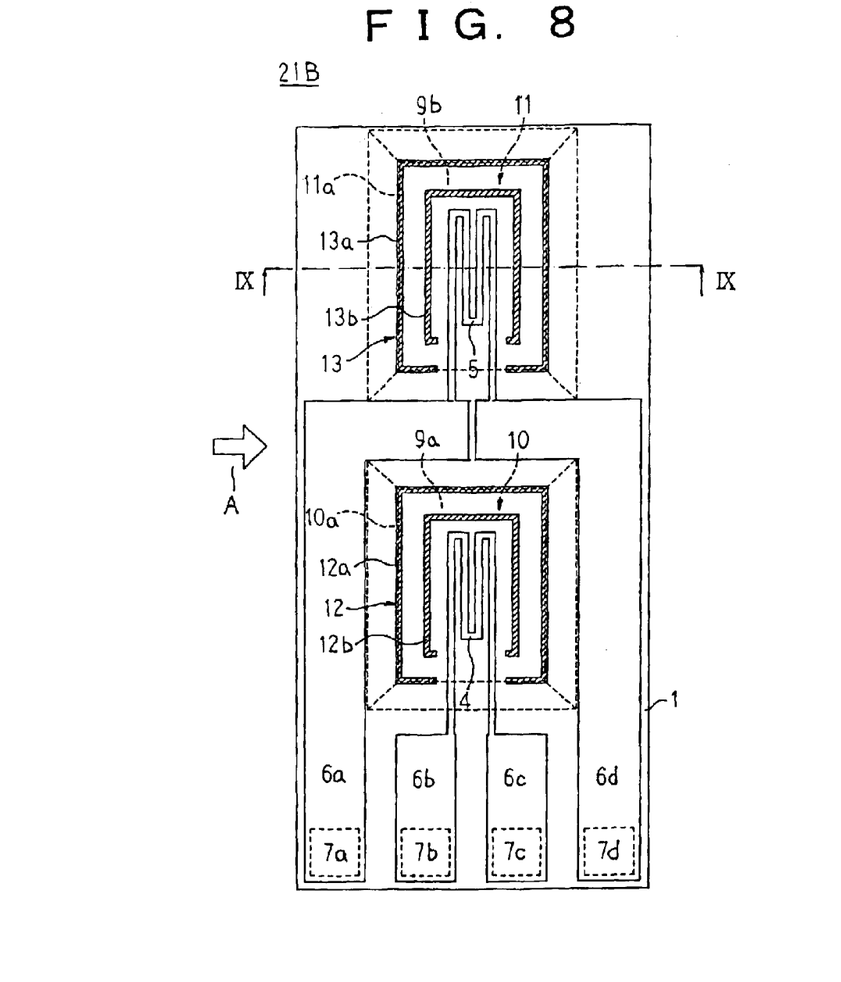
FIG. 8 is a front elevation showing another example of a defective thermosensitive flow rate detecting element.
Figure 9:
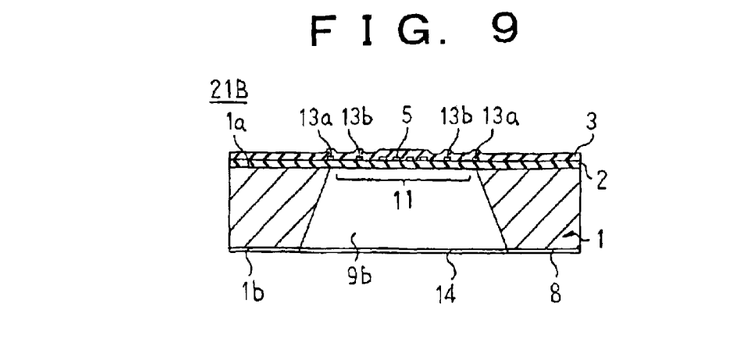
FIG. 9 is a cross section taken along line IX—IX in FIG. 8 viewed from the direction of the arrows.

Furthermore, when a thermosensitive flow rate detecting element 21B is prepared with the thickness of the flat substrate 1 thinner than a specified value or with the etching holes 14 formed larger than specified dimensions, the edge portions 10a and 11a of the first and second diaphragm portions 10 and 11 are positioned below the first patterns 12a and 13a, as shown in FIGS. 8 and 9, for example.

Figure 10:
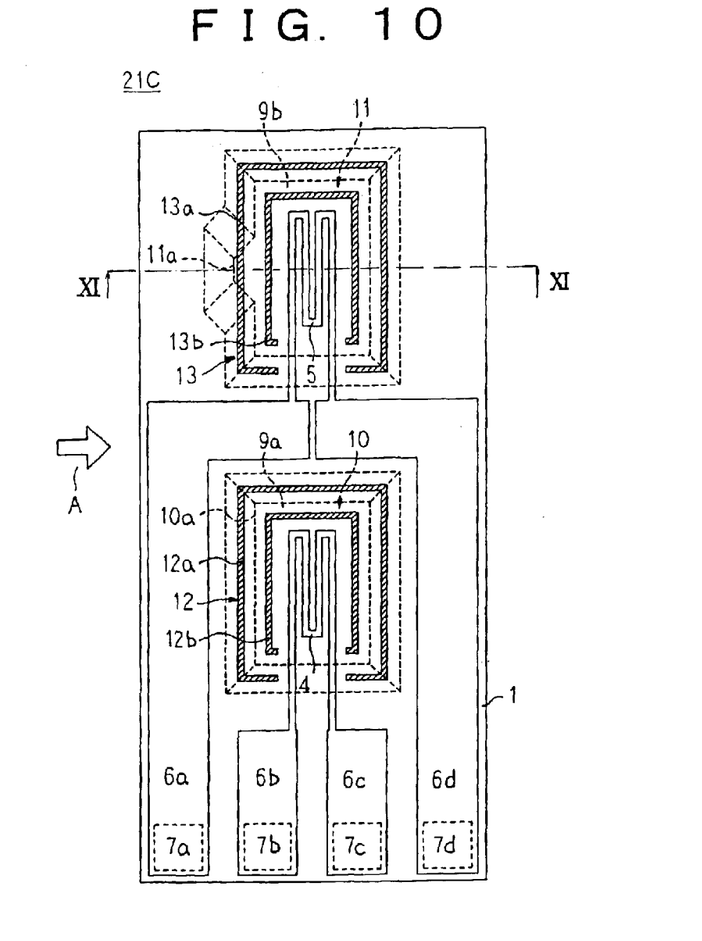
FIG. 10 is a front elevation showing yet another example of a defective thermosensitive flow rate detecting element.
Figure 11:
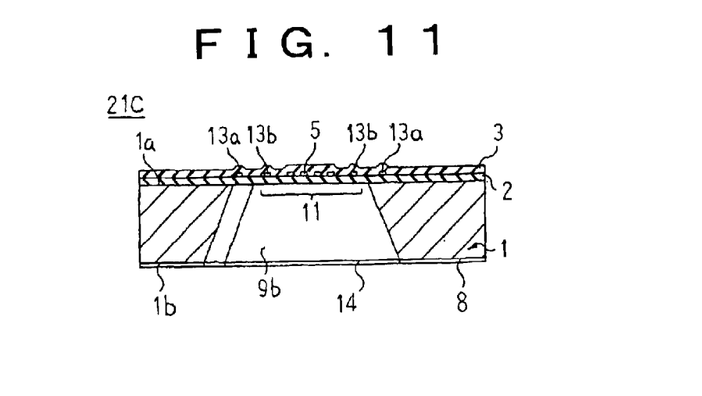
FIG. 11 is a cross section taken along line XI—XI in FIG. 10 viewed from the direction of the arrows.

Furthermore, if a thermosensitive flow rate detecting element 21C is prepared with a flaw in the rear-surface protective film 8 in the process of forming the etching holes 14, an abnormality is formed in a portion of the edge portion 11a of the second diaphragm portion 11 as shown in FIGS. 10 and 11, for example.

In a thermosensitive flow rate detecting element of this kind, since the first diaphragm portion 10 comes into contact with the flat substrate 1 around its entire perimeter, much of the heat generated by the resistance heater 4 is transferred through the first diaphragm portion 10 to the flat substrate 1, and when there is a dimensional irregularity in the first diaphragm portion 10, a misalignment of the resistance heater 4 relative to the first diaphragm portion 10, or a shape abnormality in the first diaphragm portion 10, the flow rate detection characteristics may become irregular, preventing accurate flow rate detection.

Furthermore, the fluid temperature resistance thermometer 5 is formed on the second diaphragm portion 11 in order to ensure responsiveness to changes in fluid temperature, but since the second diaphragm portion 11 comes into contact with the flat substrate 1 around its entire perimeter, it is easily subjected to the influence of the temperature of the flat substrate 1, and when there is a dimensional irregularity in the second diaphragm portion 11, a misalignment of the fluid temperature resistance thermometer 5 relative to the second diaphragm portion 11, or a shape abnormality in the second diaphragm portion 11, irregularities may occur in fluid temperature detection performance, preventing accurate flow rate detection.

In an internal combustion engine in an automobile, vibrations of 40 to 50 g (1 g=approx. 9.8 m/s$^2$) are generated, and there are also cases where the flow velocity of the intake air reaches 200 m/s or more. Furthermore, when a backfire occurs, a pressure of nearly two atmospheres may also act on the thermosensitive flow rate detecting element. Thus, when these thermosensitive flow rate detecting elements 21A, 21B, and 21C are subjected to mechanical stress of this kind, the diaphragm portion may be damaged.

For that reason, it is necessary to control the dimensions of the first and second diaphragm portions 10 and 11, the positions of the resistance heater 4 and the fluid temperature resistance thermometer 5 relative to the first and second diaphragm portions 10 and 11, and the shapes of the first and second diaphragm portions 10 and 11 to within a predetermined range of irregularity. In a thermosensitive flow rate detecting element employing a diaphragm construction, since the diaphragm portion is constituted by a thin film, it is easy to detect the edge portions of the diaphragm portion from the front surface 1a side of the flat substrate 1, but micron-order measurements are required in order to inspect the dimensions of the diaphragm portion, which is extremely difficult.

According to Embodiment 1, the resistance heater dummy pattern 12 and the resistance thermometer dummy pattern 13 are constituted by first patterns 12a and 13a formed at the maximum dimensions of the tolerance values of the dimensions of the first and second diaphragm portions 10 and 11, and second patterns 12b and 13b formed at the minimum dimensions of the tolerance values of the dimensions of the first and second diaphragm portions 10 and 11, respectively, and the edge portions 10a and 11a of the first and second diaphragm portions 10 and 11 are positioned between the first patterns 12a and 13a and the second patterns 12b and 13b.

Thus, because the dimensions of the first and second diaphragm portions 10 and 11 are inside the tolerance range, the positions of the resistance heater 4 and the fluid temperature resistance thermometer 5 relative to the first and second diaphragm portions 10 and 11 are inside the tolerance range, and there are no shape abnormalities in the first and second diaphragm portions 10 and 11, irregularities in the flow rate detection characteristics and fluid temperature detection performance are suppressed, enabling accurate flow rate detection, and accidents damaging to the first and second diaphragm portions 10 and 11 are suppressed, providing a thermosensitive flow rate detecting element enabling reliability to be increased.

Furthermore, it is sufficient simply to determine whether the edge portions 10a and 11a of the first and second diaphragm portions 10 and 11 are positioned between the first patterns 12a and 13a and the second patterns 12b and 13b, in other words, it is not necessary to measure the dimensions of the first and second diaphragm portions 10 and 11, thereby facilitating inspection of the thermosensitive flow rate detecting element 20.

Because the resistance heater dummy pattern 12 and the resistance thermometer dummy pattern 13 is made by a thermosensitive resistor film, the resistance heater dummy pattern 12 and the resistance thermometer dummy pattern 13 can be prepared using a process identical to that for the resistance heater 4 and the fluid temperature resistance thermometer 5. Thus, the manufacturing process for the thermosensitive flow rate detecting element is simplified and the positional relationships between the resistance heater dummy pattern 12 and the resistance heater 4 and between the resistance thermometer dummy pattern 13 and the fluid temperature resistance thermometer 5 can be ensured with high precision, suppressing irregularities in the flow rate detection characteristics and fluid temperature detection performance.

Moreover, in Embodiment 1 above, if the first and second diaphragm portions 10 and 11 are prepared by silicon (Si) crystal anisotropic etching using a single-crystal Si substrate whose front surface is composed of a (100) plane for the flat substrate 1 with an alkali solution such as KOH, TMAH, NaOH, etc., as the etchant, it is desirable for the first and second patterns 12a, 12b, 13a, and 13b to be formed substantially parallel to a <110> direction of the Si crystal orientation. In other words, when Si crystal anisotropic etching is performed using an alkali solution, the edge portions 10a and 11a of the first and second diaphragm portions 10 and 11 form rectangles surrounded by the <110> direction. Thus, the first and second patterns 12a, 12b, 13a, and 13b and the edge portions 10a and 11a of the first and second diaphragm portions 10 and 11 are substantially parallel, facilitating inspection of the shape dimensions.

Furthermore, in Embodiment 1 above, the resistance heater dummy pattern 12 is constituted by: a first pattern 12a formed outside four edge portions 10a of the first diaphragm portion 10 so as to lie alongside the edge portions 10a, and a second pattern 12b formed inside the four edge portions 10a so as to lie alongside the edge portions 10a, but the resistance heater dummy pattern is not limited to this construction and need only be constituted by: a first pattern formed outside at least two adjacent edge portions 10a of the first diaphragm portion 10 so as to lie alongside the edge portions 10a, and a second pattern formed inside at least two adjacent edge portions 10a so as to lie alongside the edge portions 10a. Moreover, the same applies to the resistance thermometer dummy pattern 13.

Furthermore, in Embodiment 1 above, the resistance heater dummy pattern 12 is constituted by: a first pattern 12a formed outside four edge portions 10a of the first diaphragm portion 10 so as to lie alongside the edge portions 10a, and a second pattern 12b formed inside the four edge portions 10a so as to lie alongside the edge portions 10a, but the resistance heater dummy pattern is not limited to this construction and need only be constituted by at least one of the first pattern 12a and the second pattern 12b. In addition, the first pattern (or the second pattern) is not limited to a frame-shaped pattern and may also be an L-shaped pattern formed outside (or inside) at least two adjacent edge portions 10a of the first diaphragm portion 10 so as to lie alongside the edge portions 10a. In that case, in the process of inspecting the dimensions and misalignment of the diaphragm portion 10, gaps between the first pattern 12a (or the second pattern 12b) and the edge portions 10a of the first diaphragm portion 10 are measured to determine whether or the measured value is within in the tolerance range. Moreover, the same applies to the resistance thermometer dummy pattern 13.

In addition, in Embodiment 1 above, the tolerance values for the desired values of the dimensions and shapes of the first and second diaphragm portions 10 and 11 have been explained as being ±50 μm, but the tolerance values are not limited to ±50 μm and may be appropriately set according to the specifications of the thermosensitive flow rate detecting element.

Embodiment 2

Figure 12:
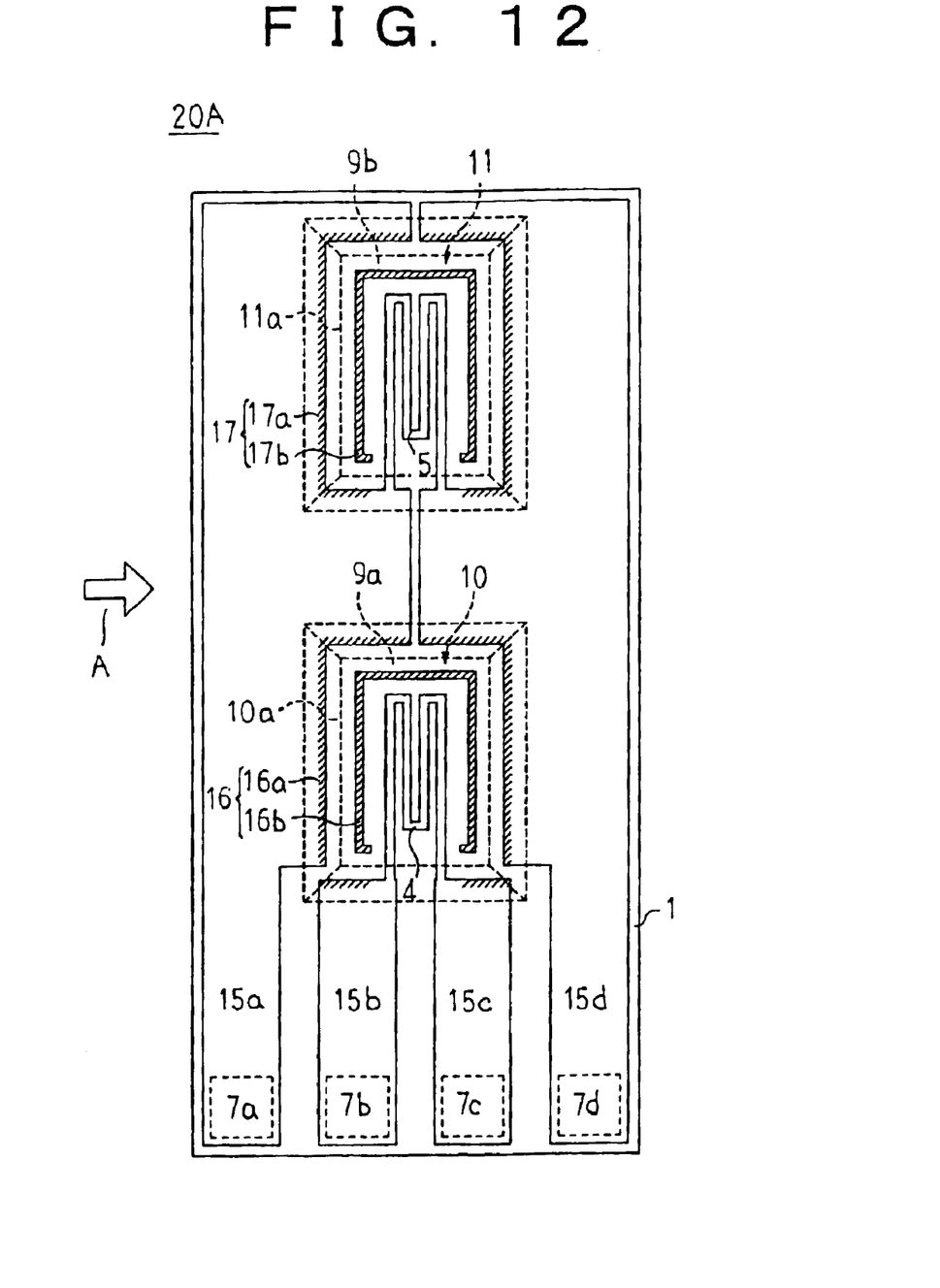
FIG. 12 is a front elevation showing a thermosensitive flow rate detecting element according to Embodiment 2 of the present invention.

FIG. 12 is a front elevation showing a thermosensitive flow rate detecting element according to Embodiment 2 of the present invention.

In a thermosensitive flow rate detecting element 20A according to Embodiment 2, as indicated by hatching in FIG. 12, first patterns 16a and 17a formed outside four edge portions 10a and 11a of the first and second diaphragm portions 10 and 11 so as to lie alongside the edge portions 10a and 11a are formed on the patterns of first to fourth lead patterns 15a to 15d. Second patterns 16b and 17b are formed inside four edge portions 10a and 11a of the first and second diaphragm portions 10 and 11 so as to lie alongside the edge portions 10a and 11a. A resistance heater dummy pattern 16 is constituted by the first pattern 16a and the second pattern 16b, and a resistance thermometer dummy pattern 17 is constituted by the first pattern 17a and the second pattern 17b.

Here, the first and second patterns 16a, 16b, 17a, and 17b are formed to dimensions allowable relative to the desired values of the dimensions of the first and second diaphragm portions 10 and 11. For example, when the desired values of the dimensions of the first and second diaphragm portions 10 and 11 are 1.5 mm×2 mm, the first patterns 16a and 17a are formed into an inner perimeter shape of (1.5 mm+50 μm)×(2 mm+50 μm), and the second patterns 12b and 13b are formed into a partially cut away frame shape with a pattern width of 10 μm having an outer perimeter shape of (1.5 mm−50 μm)×(2 mm−50 μm).

Moreover, the rest of this embodiment is constructed in a similar manner to Embodiment 1 above.

According to Embodiment 2, because the size of the pattern width of the first to fourth lead patterns 15a to 15d can be increased by an amount proportionate to the dummy patterns 12 and 13 which are not formed, the resistance values of the first to fourth lead patterns 15a to 15d, which are error-inducing components of the resistance components of the resistance heater 4 and the fluid temperature resistance thermometer 5 which constitute the detector portion, are reduced, enabling flow rate detection precision to be increased.

Embodiment 3

Figure 13:
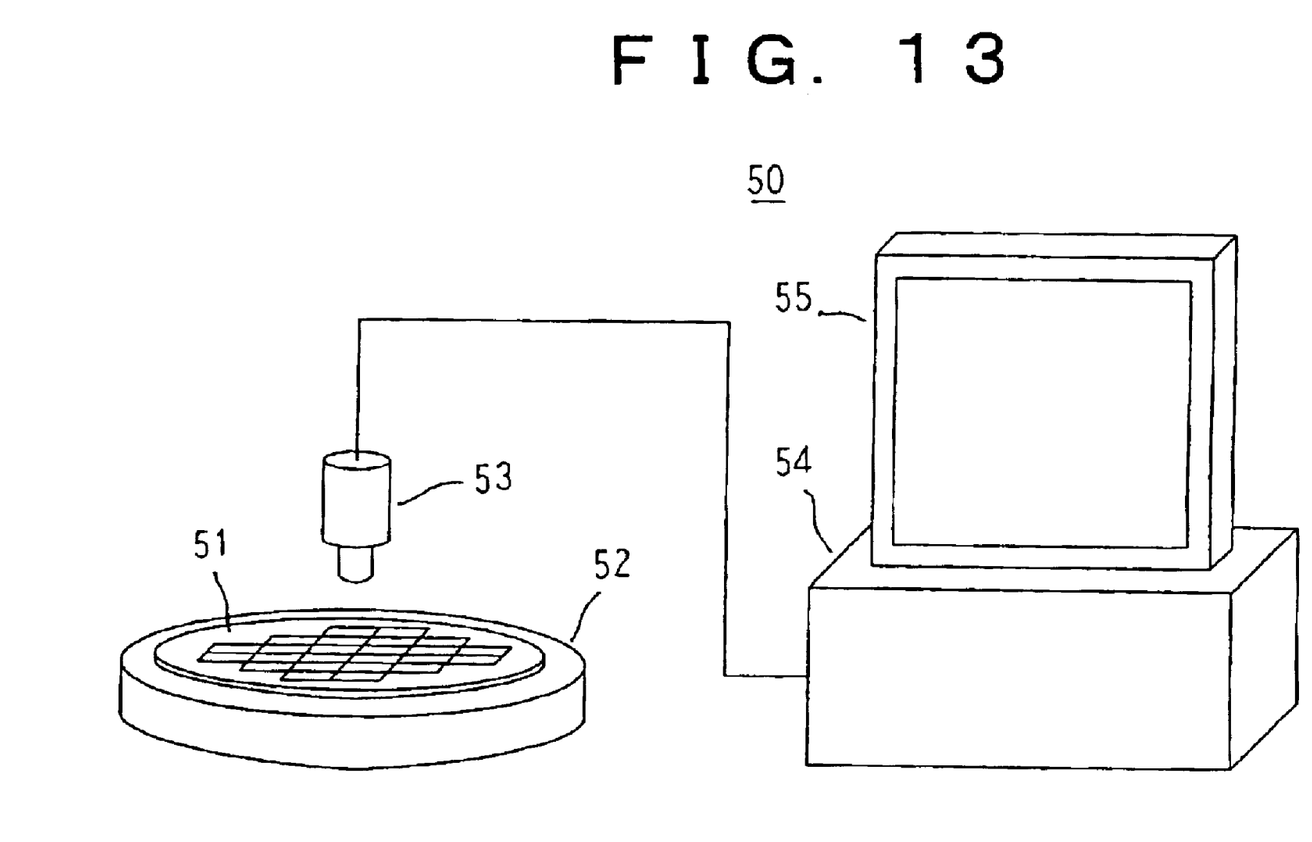
FIG. 13 is a diagram explaining a shape inspection process for the diaphragm portion of the thermosensitive flow rate detecting element according to Embodiment 3 of the present invention.

FIG. 13 is a diagram explaining a shape inspection process for the diaphragm portion of the thermosensitive flow rate detecting element according to Embodiment 3 of the present invention.

In FIG. 13, a diaphragm portion shape inspection apparatus 50 is constituted by: a stage 52 for fixing and moving a silicon wafer 51 on which thermosensitive flow rate detecting elements 20 have been prepared; a camera 53 functioning as an imaging device for taking images of a front surface of the thermosensitive flow rate detecting elements 20; an image processing device 54 for processing the images taken by the camera 53, recognizing the resistance heater and resistance thermometer dummy patterns 12 and 13 and the edge portions 10a and 11a of the first and second diaphragm portions 10 and 11, and determining whether the first and second diaphragm portions 10 and 11 are normal or abnormal from the positional relationship between the dummy patterns 12 and 13 and the edge portions 10a and 11a of the first and second diaphragm portions 10 and 11; and a monitor 55 for displaying the processed images.

Next, an inspection method using this diaphragm portion shape inspection apparatus 50 will be explained.

First, a large number of thermosensitive flow rate detecting elements 20 are prepared into a silicon wafer 51 in a similar manner to Embodiment 1 above, then the silicon wafer 51 is mounted on the stage 52. Then, positioning between the camera 53 and the thermosensitive flow rate detecting elements 20 is performed by moving the stage 52, and images are taken by the camera 53. The image processing device 54 processes the images taken, recognizes the resistance heater and resistance thermometer dummy patterns 12 and 13 and the edge portions 10a and 11a of the first and second diaphragm portions 10 and 11, and determines whether the first and second diaphragm portions 10 and 11 are normal or abnormal from the positional relationship between the dummy patterns 12 and 13 and the edge portions 10a and 11a of the first and second diaphragm portions 10 and 11. If the edge portions 10a and 11a of the first and second diaphragm portions 10 and 11 are positioned between the first patterns 12a and 13a and the second patterns 12b and 13b of the resistance heater and resistance thermometer dummy patterns 12 and 13, then it is determined that the shape dimensions of the first and second diaphragm portions 10 and 11 are normal, and that the positions of the first and second diaphragm portions 10 and 11 relative to the resistance heater 4 and the fluid temperature resistance thermometer 5 are normal. Here, because the first and second diaphragm portions 10 and 11 of the thermosensitive flow rate detecting elements 20 are made by thin films, the edge portions 10a and 11a of the first and second diaphragm portions 10 and 11 can easily be checked from the front surface of the silicon wafer 51 by means of penetration by light. Next, the thermosensitive flow rate detecting elements 20 are cut out of the silicon wafer 51, and only those elements determined to be normal are produced as thermosensitive flow rate detecting elements 20.

According to Embodiment 3, because the edge portions of the dummy patterns 12 and 13 and the edge portions 10a and 11a of the diaphragm portions 10 and 11 can be detected automatically by means of image processing without needing to perform the shape dimension inspection of the diaphragm portions by means of visual inspection by magnifying the thermosensitive flow rate detecting element 20 with an optical microscope, etc., automation of the shape dimension inspection of the diaphragm portions can be achieved. As a result, it is possible to inspect the shapes of the diaphragm portions 10 and 11 simply and accurately, suppressing irregularities in the flow rate detection characteristics and fluid temperature detection performance, thereby providing a thermosensitive flow rate detecting element having high reliability.

In Embodiment 3, determination of whether the edge portions 10a and 11a of the first and second diaphragm portions 10 and 11 are normal is based on whether they are positioned between the first patterns 12a and 13a and the second patterns 12b and 13b of the resistance heater and resistance thermometer dummy patterns 12 and 13, but the gaps between the first and second patterns 12a, 12b, 13a, and 13b and the edge portions 10a and 11a may also be calculated, determination of normality being based on whether the gaps are within the tolerance values.

Moreover, each of the above embodiments has been explained for a thermosensitive flow rate detecting element employing a direct heating control method or a thermosensitive flow rate detecting element employing an indirect heating control method in which a single resistance heater 4 is formed on a first diaphragm portion 10 and the flow rate of the fluid being measured is detected by the excitation current flowing through the resistance heater 4, but other types are acceptable provided that the thermosensitive flow rate detecting element is of a diaphragm type measuring the flow rate or the flow velocity by heat transfer to the fluid being measured. For example, types in which resistance thermometers are disposed upstream and downstream from the resistance heater and the temperature difference between the resistance thermometers is detected (temperature difference detection methods) are also acceptable, and types in which two resistance heaters are disposed upstream and downstream and the difference between the excitation currents flowing through each of the resistance heaters is detected (double heater methods) are also acceptable.

The present invention is constructed in the above manner and exhibits the effects described below.

According to one aspect of the present invention, there is provided a thermosensitive flow rate detecting element including:

a flat substrate;

an electrically-insulating support film formed on a front surface of the flat substrate;

a resistor made by a thermosensitive resistor film formed on the support film;

a lead pattern made by a thermosensitive resistor film formed on a front surface of the flat substrate so as to be linked to the resistor; and a rectangular diaphragm portion formed by removing a portion of the flat substrate from a rear surface side of the flat substrate under a region where the resistor is formed so as to reach the support film, wherein a dummy pattern for shape dimension inspection of the diaphragm portion is formed on a front surface of the flat substrate outside or inside or both outside and inside at least two adjacent edge portions of the diaphragm portion so as to lie alongside the edge portions, whereby the shape dimension of the diaphragm portion is suppressed to within a predetermined range of irregularity, and misalignment of the resistor relative to the diaphragm portion is suppressed to within a predetermined range, enabling a thermosensitive flow rate detecting element to be provided in which irregularities in flow rate detection characteristics and fluid temperature detection performance are reduced and reliability is high.

The dummy pattern may be formed by a thermosensitive resistor film, enabling the dummy pattern to be formed by a process identical to that of the resistor, thereby ensuring the positional relationship between the dummy pattern and the resistor with high precision.

The dummy pattern may be composed of a portion of the lead pattern, enabling the width of the lead pattern to be increased in size, thereby reducing the resistance value of the lead pattern, raising flow rate detection precision and improving reliability.

The flat substrate may be a single-crystal silicon (Si) substrate whose front surface is constituted by a (100) plane, the diaphragm portion may be formed by removing a portion of the flat substrate by means of Si crystal anisotropic etching, and an edge of the dummy pattern facing an edge portion of the diaphragm portion may be formed into a straight line generally parallel to a <110> direction of the Si crystal, enabling the positional relationship between the dummy pattern and the edge portions of the diaphragm portion to be determined accurately.

The dummy pattern may include a frame-shaped first pattern; and a frame-shaped second pattern positioned inside the first pattern, an edge portion of the diaphragm portion being positioned between the first pattern and the second pattern, eliminating the need to measure the dimensions of the diaphragm portion, thereby enabling a determination as to whether the diaphragm portion is normal to be made simply.

According to another aspect of the present invention, there is provided a method for manufacturing a thermosensitive flow rate detecting element including the steps of forming an electrically-insulating support film on a front surface of a flat substrate; forming on the support film a resistor made by a thermosensitive resistor film and a lead pattern connected to the resistor; forming on a front surface of the flat substrate a dummy pattern for shape inspection of a diaphragm portion; forming the diaphragm portion by removing a portion of the flat substrate from a rear surface side of the flat substrate under a region where the resistor is formed so as to reach the support film; and inspecting a shape dimension of the diaphragm portion based on a positional relationship between the dummy pattern and an edge portion of the diaphragm portion, thereby providing a method for manufacturing a thermosensitive flow rate detecting element enabling irregularities in the shape dimension of the diaphragm portion to be suppressed and also enabling misalignment of the resistor relative to the diaphragm portion to be suppressed.

The dummy pattern may be formed on a front surface of the flat substrate outside or inside or both outside and inside at least two adjacent edge portions of the diaphragm portion so as to lie alongside the edge portions, whereby inspection of the shape dimension of the diaphragm portion is performed easily based on the dummy pattern.

In the step of inspecting a shape dimension of the diaphragm portion, an image of the flat substrate may be taken from a front surface side by means of an imaging device, the dummy pattern and the edge portion of the diaphragm portion may be identified by means of an image processing device based on the taken image, and a determination as to whether the diaphragm portion is normal may be made from a positional relationship between the dummy pattern and the edge portion of the diaphragm portion, enabling irregularities in the shape dimension of the diaphragm portion and misalignment of the resistor relative to the diaphragm portion to be inspected simply and with high precision, and achieving automation of the inspection process.

In the step of inspecting a shape dimension of the diaphragm portion, an image of the flat substrate may be taken from the front surface side by means of an imaging device, the dummy pattern and the edge portion of the diaphragm portion may be identified by means of an image processing device based on the taken image, a gap between the dummy pattern and the edge portion of the diaphragm portion may be calculated, and a determination may be made as whether the gap is within a set value, enabling irregularities in the shape dimension of the diaphragm portion and misalignment of the resistor relative to the diaphragm portion to be inspected simply and with high precision, and achieving automation of the inspection process.

What is claimed is:

1. A thermosensitive flow rate detecting element comprising:

a flat substrate;

an electrically-insulating support film formed on a front surface of said flat substrate;

a resistor made by a thermosensitive resistor film formed on said support film;

a lead pattern made by a thermosensitive resistor film formed on a front surface of said flat substrate so as to be linked to said resistor; and a rectangular diaphragm portion formed by removing a portion of said flat substrate from a rear surface side of said flat substrate under a region where said resistor is formed so as to reach said support film, wherein a dummy pattern for shape dimension inspection of said diaphragm portion is formed on a front surface of said flat substrate outside or inside or both outside and inside at least two adjacent edge portions of said diaphragm portion so as to lie alongside said edge portions.

2. The thermosensitive flow rate detecting element according to claim 1, wherein said dummy pattern is formed by a thermosensitive resistor film.

3. The thermosensitive flow rate detecting element according to claim 2, wherein said dummy pattern is composed of a portion of said lead pattern.

4. The thermosensitive flow rate detecting element according to claim 1, wherein said flat substrate is a single-crystal silicon (Si) substrate whose front surface is constituted by a (100) plane, said diaphragm portion is formed by removing a portion of said flat substrate by means of Si crystal anisotropic etching, and an edge of said dummy pattern facing said edge portion of said diaphragm portion is formed into a straight line generally parallel to a <110> direction of said Si crystal.

5. The thermosensitive flow rate detecting element according to claim 1, wherein said dummy pattern comprises a frame-shaped first pattern and a frame-shaped second pattern positioned inside said first pattern, said edge portion of said diaphragm portion being positioned between said first pattern and said second pattern.

* * * * *